Patented Apr. 14, 1942

2,279,461

UNITED STATES PATENT OFFICE 2,279,461

TREATMENT OF MINERAL OIL PRODUCTS

Emil Hene, London, England

No Drawing. Application June 17, 1939, Serial No. 279,741. In Great Britain June 18, 1938

2 Claims. (Cl. 196—40)

This invention relates to the treatment of mineral oil products and particularly mineral oil products arising in cracking operations and has for its object to provide improvements in the purification of such products by the employment of acids as, for example, sulphuric acid.

Where acids are employed in the refining of mineral oil products, difficulty is in many cases experienced in ensuring the complete separation of the obnoxious constituents formed under the actions of the acid.

This is the case, for instance, in the treatment of the more volatile and more particularly cracked distillates with sulphuric acid and where, as is well known, the formation and settlement of the impurities which have reacted with the sulphuric acid is completed only after a relatively considerable time.

The slowness of the separation in itself is unsatisfactory from the economic point of view and the incompleteness of the separation is equally unsatisfactory.

Generally the treatment with sulphuric acid has to be followed by washing with water or with solutions which are liable to decompose any of the compounds formed by reaction with the sulphuric acid which may remain in the material treated thus causing these obnoxious bodies to be thrown back into the distillate.

The strength and quantity of acid and the operating conditions are responsible for the length of time taken in the final and complete settlement of the sludge and in ordinary plant routine the optimum conditions cannot be employed since, due to plant capacity and the necessity for securing, so far as may be, the maximum output, the proper time for settling the sludge cannot be allowed and a compromise has therefore to be made.

The position is generally the same where acids other than sulphuric acid or mixtures of acids are used.

From this, as will be appreciated, it follows that a method of or means for securing a more rapid and complete separation of the compounds formed by the treatment of mineral oil products, and particularly pressure distillates, with acids, is of great importance and the employment of sand filters and centrifuges has been suggested for this purpose.

The use of such devices is open to objection not only on account of the expense and the complication of the procedure involved, but also in view of the fact that the products thus treated soon become cloudy and a further proportion of impurities separates in the form of sludge.

The invention is based upon the observation that the formation and separation of the sludge, and more particularly what may be described as the delayed formation of sludge which normally occurs, is facilitated or accelerated by the addition to mineral oil distillates of relatively finely divided adsorptive material.

The invention therefore consists in the process of treating mineral oil distillates and particularly the more volatile distillates with the aid of sulphuric acid in which after the addition of the sulphuric acid and substantially immediately on the production of sludge, there is added a very small proportion of a finely divided adsorptive material to promote the separation of the sludge-forming bodies.

As examples of such materials adsorptive carbons and silicious material, for instance, silica gel or alumina gel, kieselguhr, and fuller's earth may be mentioned.

By the employment of such adsorptive materials in the manner specified not only would it appear that the highly dispersed sludge or sludge-forming bodies are adsorbed or coagulated, and thus the speed of settlement increased, but in addition it is found that the formation of the last traces of sludge which would occur normally only after the lapse of relatively considerable time, is accelerated to such a degree that within a few seconds the whole of the sludge can be settled, whereas under the more usual conditions, a period of 30 minutes or even more would be required.

At this point it may be noted that it is more or less general practice to treat petroleum products, after they have been subjected to the action of sulphuric acid, and after standing for a relatively considerable time, so that the sludge may separate, by bringing them into contact with adsorptive or decolorising agents and, for instance, decolorising carbons of kieselguhr, and that numerous proposals have been made to use for the purpose of decolorising such mineral oil products adsorptive materials and, for instance, carbon or kieselguhr, which have been impregnated with extremely small proportions of sulphuric acid or other impregnating agents.

The process in accordance with the invention may be carried out without artificial cooling, but if desired artificial cooling may be resorted to.

Generally, in accordance with the invention, the proportion of acid relatively to the mineral oil distillate treated may be reduced, which is of advantage not only from the point of view of the consequent economy in the consumption of acid but also from the point of view of the reduction in losses due to polymerisation and solution of hydrocarbon material and otherwise in the direction of overcoming or minimising the known disadvantages arising from the use of acid.

The solid normally adsorptive bodies used are employed at relatively low temperatures and thus in respect of the mode of use of such bodies, the invention is distinguished from treatments in which such or similar bodies are employed as decolorising agents.

In certain cases it may be found convenient to effect separation of the main body of sludge which forms as the result of the treatment of mineral oil products with sulphuric acid before adding the solid and normally adsorptive bodies.

In many cases it is found that not only is the formation and separation of the sludge-forming materials facilitated by the invention, but in addition it has been found that refined cracked gasolenes produced by distillation of the treated products are so free of colour- and gum-forming bodies that they remain stable on storage in the light and the dark for long periods of time.

Experience would appear to show that the employment of a proportion of activated carbon in carrying the invention into effect is desirable, possibly for the reason that such carbon contains a proportion of oxygen which may effect or assist the oxidation of certain undesirable constituents of mineral oil fractions treated and more particularly the sulphur-containing bodies such as mercaptans.

Generally it is found that it is desirable to restrict the proportion of activated carbon used and thus to use, for instance, a proportion of activated carbon in association with a larger proportion of relatively inactive carbon such as charcoal or other relatively inactive adsorptive material. The proportion of activated charcoal employed may in fact be quite small.

The activated charcoal used may be derived from a variety of sources and, for instance, from coconut shell or it may be obtained from coal by coking at appropriate temperatures and subsequent treatment in a known manner to secure activation or to produce a material which is highly adsorptive.

The following particulars are given by way of example of a method of carrying the invention into effect and the results which have been secured in a particular case.

1,000 gallons of a cracked distillate containing the gasolene fraction were treated with sulphuric acid 63° Bé. in the proportion of 2.2 lbs. per barrel of distillate and the bulk of the sludge allowed to settle during a period of about 5 minutes.

The distillate was then decanted and intimately mixed during a period of about 2 minutes with 800 grams of active carbon made from coconut shell, and 1600 grams of coconut shell charcoal both crushed to pass a sieve having 80 holes per linear inch.

Substantially the whole of the sludge and what may be described as the potential sludge settled out on standing for a period of about 2 minutes.

The separation by settlement in many cases is sufficient but if desired the distillate may be subjected to filtration.

Further treatment of the distillate by washing with alkali or water is not in all cases necessary, and if resorted to may be effected by the employment of such agents in considerably reduced proportions.

The product thus obtained was found to exhibit a high induction period and to possess a high degree of colour stability when exposed to the light and when stored in darkness.

I claim:

1. The process of treating mineral oil distillates for effecting the separation of sludge and sludge forming impurities which comprises admixing sulphuric acid with the mineral oil distillate in the proportion of between 2 and 3 pounds of the former to one barrel of the latter, allowing the mixture to stand for a period of the order of five minutes, separating the sludge from the distillate, and adding to the distillate a very small proportion of an adsorptive material, to promote the conversion of sludge forming constituents in the oil into sludge, and removing from the distillate the sludge so formed.

2. The process of treating mineral oil distillates for effecting the separation of sludge and sludge forming impurities which comprises admixing sulphuric acid with the mineral oil distillate, in the proportion of about 2 to 3 pounds per barrel, allowing the mixture to stand for a period of the order of five minutes, separating the sludge from the distillate, and adding to the distillate a very small proportion of adsorptive carbon, to promote the conversion of sludge forming constituents in the oil into the sludge, and thereafter removing from the distillate the sludge so formed.

EMIL HENE.